US009824317B2

(12) United States Patent
Lustig

(10) Patent No.: US 9,824,317 B2
(45) Date of Patent: *Nov. 21, 2017

(54) PRICE-AND-BRANCH ALGORITHM FOR MIXED INTEGER LINEAR PROGRAMMING

(71) Applicant: International Business Machines Corporation, Armonk, NY (US)

(72) Inventor: Irvin J. Lustig, Short Hills, NJ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/202,630

(22) Filed: Jul. 6, 2016

(65) Prior Publication Data

US 2017/0024669 A1    Jan. 26, 2017

Related U.S. Application Data

(63) Continuation of application No. 14/277,131, filed on May 14, 2014, now Pat. No. 9,418,046.

(51) Int. Cl.
| | |
|---|---|
| *G06F 7/00* | (2006.01) |
| *G06Q 10/06* | (2012.01) |
| *G06F 17/11* | (2006.01) |
| *G06N 5/02* | (2006.01) |

(52) U.S. Cl.
CPC ........ *G06Q 10/06311* (2013.01); *G06F 17/11* (2013.01); *G06N 5/022* (2013.01)

(58) Field of Classification Search
CPC .... G06Q 10/06311; G06F 17/11; G06N 5/022
USPC ........................................................ 708/207
See application file for complete search history.

(56) References Cited

U.S. PATENT DOCUMENTS

| | | | |
|---|---|---|---|
| 6,092,047 | A | 7/2000 | Hyman et al. |
| 7,346,528 | B2 | 3/2008 | Thengvall et al. |
| 8,346,845 | B2 | 1/2013 | Khandekar et al. |
| 8,463,729 | B2 | 6/2013 | Achterberg |
| 2006/0089864 | A1 | 4/2006 | Feng et al. |
| 2006/0171316 | A1 | 8/2006 | El-Sakkout et al. |
| 2009/0182814 | A1 | 7/2009 | Tapolcai et al. |
| 2009/0254405 | A1 | 10/2009 | Hollis |

(Continued)

OTHER PUBLICATIONS

M. Benichou et al. Ttl: Mixed Integer Linear Programming; Feb. 22, 2005, Database: ip.com; ip.com No. IPCOM000072933D.

(Continued)

*Primary Examiner* — Tan V. Mai
(74) *Attorney, Agent, or Firm* — Harrington & Smith

(57) ABSTRACT

A method includes forming a working mixed integer linear program (MILP) from a given MILP for job allocation to allocate people to jobs at least by choosing a subset of variables from the MILP. Only person/job combinations that are deemed most valuable are chosen for the subset. The working MILP includes the chosen subset of variables but no other variables from the given MILP. The working MILP is solved to determine a solution. Using the solution, a special linear program is formed and solved to determine a price of each constraint relative to the solution. Using the prices, variables that are not in the working MILP are evaluated to determine any variables that can contribute to an improved solution. The variables evaluated as contributing to an improved solution are added to the working MILP. The working MILP with the added variables is solved. Apparatus and program products are also disclosed.

20 Claims, 3 Drawing Sheets

(56) References Cited

U.S. PATENT DOCUMENTS

2009/0271230 A1  10/2009  Huang et al.
2011/0066258 A1  3/2011   Torzhkov et al.
2013/0060728 A1  3/2013   Beraudier et al.
2014/0122390 A1  5/2014   Narisetty et al.
2014/0200964 A1  7/2014   Hassanzadeh et al.
2015/0235247 A1  8/2015   Saxena et al.

OTHER PUBLICATIONS

Barnhart, et al., "Branch-and-Price: column Generation for Solving Huge Integer Programs", Operations Research, vol. 46, No. 3, pp. 315-329 (1998).

Giovanni Righini, "Column Generation", Presentation, downloaded from http://http://www/dtl/unimi.it/~righini/Didattica/ComplementiRicercaOperativa/MaterialeCRO/CG.pdf on Aug. 29, 2013.

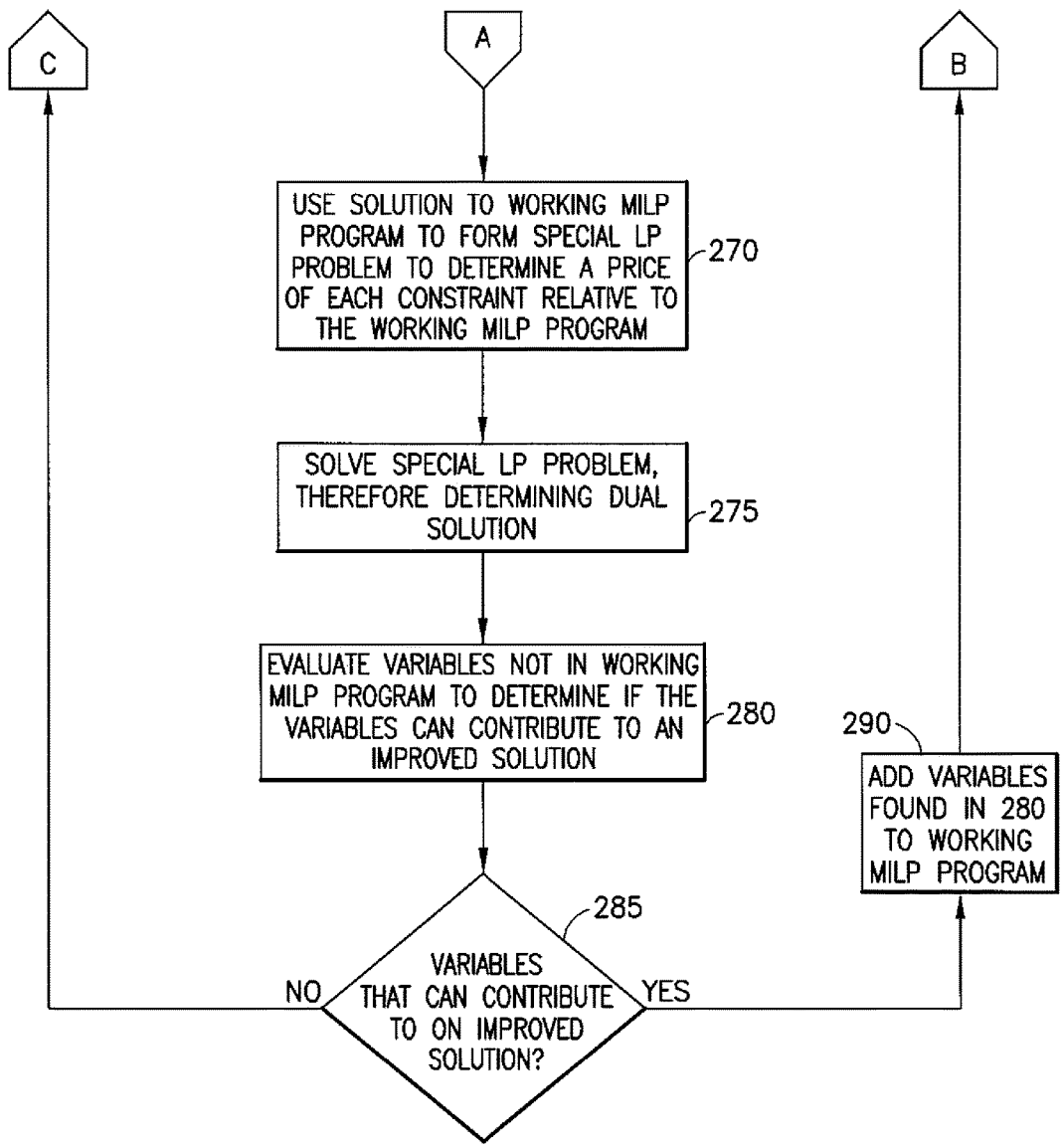

PRICE-AND-BRANCH ALGORITHM FOR MIXED INTEGER LINEAR PROGRAMMING

CROSS-REFERENCE TO RELATED APPLICATIONS

This application is a continuation of U.S. patent application Ser. No. 14/277,131, filed on May 14, 2014, the disclosure of which is hereby incorporated by reference in its entirety.

BACKGROUND

This invention relates generally to analysis of mixed integer linear programs (MILPs) and, more specifically, relates to price-and-branch techniques for mixed integer linear programs.

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

A mixed-integer linear program (MILP) is a problem representing the minimization or maximization of a linear function subject to linear constraints, where a designated set of decision variables are required to take on integer values. These problems are typically represented using a matrix structure, where constraints correspond to rows and columns correspond to decision variables. The optimal solution is a set of values of the decision variables that gives the optimum objective value, which is the minimum or maximum value of the linear function subject to the constraints.

Techniques for mixed integer linear programming have been developed since the 1960s. These MILP problems have many applications and may be solved using computer systems. In fact, there are computer programs made specifically to solve MILP problems. One such solver is called the IBM ILOG CPLEX Optimizer, which is a high-performance mathematical programming solver for solving linear programs, mixed integer programs, and quadratic programs.

One application for MILP is job allocation. For instance, suppose people are being allocated to jobs, and there are many people and many jobs. A typical solver would require all the possible person/job combinations to be given to the solver, with each combination corresponding to a decision variable, and the problem would not be tractable when the number of combinations is large. Even if the problem is tractable, a MILP solver may take a very long time to determine a solution, dependent on the complexity of the linear constraints.

Ideally, one would solve a MILP by presenting all of the decision variables to the MILP solver, but the larger the number of variables, the longer the solution takes to compute (or becomes intractable). In some applications, the number of decision variables may become so large that time criteria are not met and/or the problem is no longer tractable.

Branch-and-price mechanisms have been developed to attempt to reduce solution time and/or make a problem tractable by not representing all of the decision variables to the MILP solver. Branch-and-price is a branch-and-bound method in which at each node of a search tree, columns may be added to a linear program (LP) relaxation. At the start of the algorithm, sets of columns are excluded from the LP relaxation in order to reduce the computational and memory requirements and then columns are added back to the LP relaxation as needed. Prices are determined every time a linear program is solved in between branching. Branching occurs when certain conditions are met. The approach is based on the observation that, for large problems, most columns will have their corresponding variable equal to zero in any optimal solution. Thus, the large majority of the columns are irrelevant for solving the problem.

Current branch-and-price mechanisms do improve solution time, but these mechanisms discard much of the power of the mixed integer programming optimizer.

BRIEF SUMMARY

The following summary is merely intended to be exemplary. The summary is not intended to limit the scope of the claims.

A method includes forming a working mixed integer linear program (MILP) from a given MILP at least by choosing a subset of variables from the given MILP, wherein the working MILP includes the chosen subset of variables but no other variables from the given MILP. Only person/job combinations that are deemed most valuable are chosen for the subset. The working MILP is solved to determine a solution. Using the solution, a special linear program is formed and solved to determine a price of each constraint relative to the solution. Using the prices, variables that are not in the working MILP are evaluated to determine any variables that can contribute to an improved solution. The variables evaluated as contributing to an improved solution are added to the working MILP. The working MILP with the added variables is solved. Apparatus and program products are also disclosed.

BRIEF DESCRIPTION OF THE SEVERAL VIEWS OF THE DRAWINGS

FIG. 2, including FIGS. 2A and 2B, is a logic flow diagram for performing a price-and-branch algorithm for mixed integer linear programming, and illustrates the operation of an exemplary method, a result of execution of computer program instructions embodied on a computer readable memory, and/or functions performed by logic implemented in hardware, in accordance with an exemplary embodiment.

DETAILED DESCRIPTION

The exemplary embodiments include methods for solving large scale mixed integer linear programs, based on solving a "working problem" that represents a subset of the decision variables. For instance, an exemplary method might include the following non-limiting operations:

1) Given a mixed integer linear program (MILP), a subset of the decision variables is chosen, and a working problem (called a working MILP program herein) is created.

2) This smaller MILP is then solved with a commercial solver, using all the possible machinery for solving the smaller problem to optimality.

3) Using the solution from the working problem, a special linear program is created to determine the price of each constraint relative to that solution.

4) Using those prices, the variables that are not in the working problem are evaluated to see if the variables can contribute to an improved solution. If so, those variables are added to the working problem, and the procedure is repeated.

This technique is called "price-and-branch", since pricing is performed first in (3), and then branching is performed, e.g., in (2).

An exemplary benefit of the instant exemplary embodiments is that only some of the variables are presented to a commercial solver while yielding a suitable solution. For instance, for the job allocation example previously described, with a price-and-branch algorithm used herein, only the person/job combinations that are deemed most valuable are passed to the MILP solver. This still yields a complete and suitable solution that nears an optimum solution.

Figure 1:
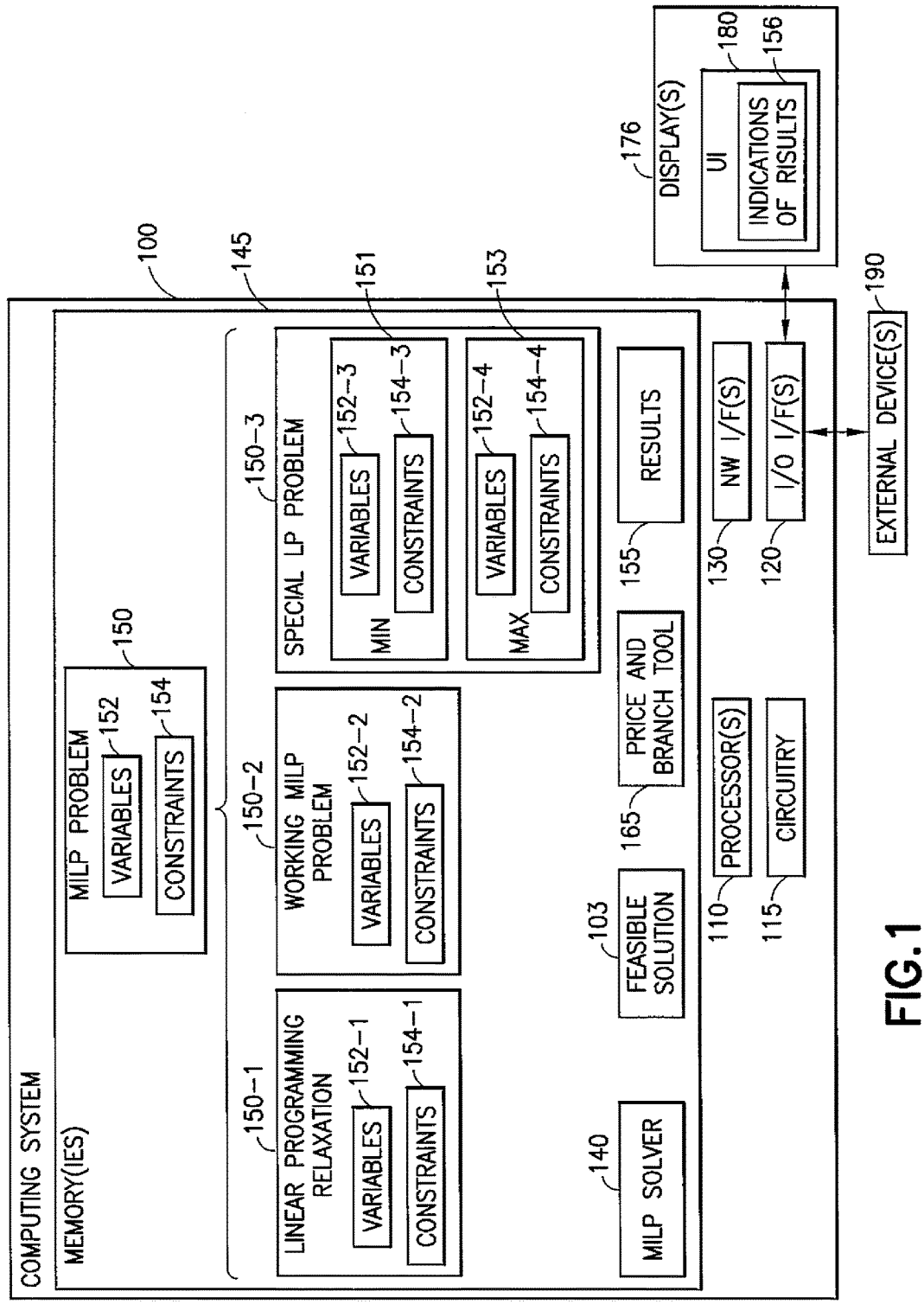
FIG. 1 is a block diagram of an example of a system suitable for performing the exemplary embodiments herein.

Before proceeding with additional detailed description of exemplary algorithms for solving MILP problems, reference may be made to FIG. 1, which provides an overview of a computing system 100 suitable for use with exemplary embodiments herein. The computing system 100 comprises one or more memories 145, one or more processors 110, one or more I/O interfaces 120, and one or more wired or wireless network interfaces 130. Alternatively or in addition to the one or more processors 110, the computing system 100 may comprise circuitry 115. The computing system 100 is coupled to or includes one or more displays 176 and one or more external device(s) 190. In one example, the one or more memories 145 include a MILP problem 150 including (e.g., n) variables 152 and (e.g., m) constraints 154, a MILP solver 140, a feasible solution 103, a price and branch tool 165, and results 155. There are a number of ways of representing the MILP problem 150, including a linear programming relaxation 150-1 (with variables 152-1 and constraints 154-1), a working MILP problem 150-2 (with variables 152-2 and constraints 154-2), and a special LP problem 150-3 (with variables 152-3 and constraints 154-3 for a minimization, min, version 151 and variables 152-4 and constraints 154-4 for a maximization, max, version 153). These are described in more detail below. The price and branch tool 165 is implemented in an exemplary embodiment as computer-readable program code that is executable by the one or more processors 110 to cause the computing system 100 to perform one or more of the operations described herein. In another example, the operations may also be performed, in part or completely, by circuitry 115 that implements logic to carry out the operations. The circuitry 115 may be implemented as part of the one or more processors 110 or may be separate from the one or more processors 110.

The processors 110 may be any processing units, such as digital signal processors and/or single-core or multi-core general purpose processors. The circuitry 115 may be any electronic circuit such as an application specific integrated circuit or programmable logic. The memories 145 may comprise non-volatile and/or volatile RAM (random access memory), cache memory, NAND-based flash memory, long term storage (e.g., hard drive), and/or read only memory. The one or more I/O interfaces 120 may include interfaces through which a user may interact with the computing system 100. The display(s) 176 may be a touchscreen, flatscreen, monitor, television, projector, as examples.

In one embodiment, users interact with the price and branch tool 165 through the UI 180 on the display 176 in an exemplary embodiment or through the network interface(s) 130 in another non-limiting embodiment. The external device(s) 190 enable a user to interact in one exemplary embodiment with the computing system 100 and may include a mouse, trackball, keyboard, and the like. The network interfaces 130 may be wired and/or wireless and may implement a number of protocols, such as cellular or local area network protocols. The elements in computing system 100 may be interconnected through any technology, such as buses, traces on a board, interconnects on semiconductors, and the like.

The price and branch tool 165 generates results 155 as a suitable solution to the MILP 150. Indications 156 of the results could be shown on UI 180 and displayed to a user or sent via the network interface(s) 130 to a user.

Exemplary algorithms are described in more detail below, but briefly, the MILP problem 150 is assumed to be very large, such as having thousands, hundreds of thousands, or millions of variables, such that a complete solution to the MILP problem 150 cannot be determined within a reasonable amount of time or is intractable if only the MILP solver 140 was used to solve the problem. In order to provide a suitable solution (e.g., the results 155) to the MILP problem 150, the price and branch tool 165 first solves a linear programming relaxation 150-1 of the MILP problem 150. The price and branch tool 165 forms a working MILP problem 150-2, where only a subset (that is, some but not all and typically many fewer) variables 152-2 of the variables 152 of the MILP problem 150 are solved. In an exemplary embodiment, the feasible solution 103, which is a solution to the MILP problem 150 that satisfies the constraints 154, and the solution to the linear programming relaxation 150-1 are used to form the working MILP problem 150-2. The working MILP problem 150-2 is solved by the MILP solver 140. The special LP problem 150-3 includes a special primal linear program that includes minimization (Min) (e.g., primal) version 151 in FIG. 1 (with variables 152-3 corresponding to the variables 152-2 and constraints 154-3 corresponding to the constraints 154-2), and a dual version referred to in FIG. 1 as a maximization (Max) version 153. The price and branch tool 165 uses a solution of the maximum version to evaluate whether variables that are not in the working MILP problem 150-2 would contribute to an improved solution of the working MILP problem 150-2 (and therefore to the MILP problem 150). If so, the variables from 152-3 that would contribute to an improved solution of the working MILP problem 150-2 are added to the working MILP problem 150-2 and the process is repeated until, e.g., a time period expires. The constraints 154-1, 154-2, and 154-3 are the same, although there is an extra constraint in 154-3 (as described below), and the constraints 154-2 only include the variables 152-2, while the constraints 154-1 and 154-3 include all the variables 152. However, the constraints 154-4 are totally different constraints, as these constraints are dual to the ones in 154-3.

Now that a brief introduction has been provided, a more detailed description follows. For ease of reference, the rest of the instant disclosure is divided into a number of sections.

1. Introduction

It is desired to solve the following mixed integer program (e.g., MILP 150):

$$\text{minimize } c^T x$$

$$\text{subject to } Ax = b$$

$$x \geq 0$$

$$x \in \mathfrak{R}^n$$

$$x_z \text{ integer} \tag{1.1}$$

In the above MILP problem 150, c is a vector of coefficients, T means transpose, and b is termed the right-hand-side.

It is assumed that the set $Z \subseteq \{1, \ldots, n\}$ represents the variables required to be integer and that n is large. Let m denote the number of (e.g., linear) constraints, i.e., the number of rows in the matrix A (where the number, n, of columns in the matrix A corresponds to the number of variables). It is noted that constraints such as $x \geq 0$ are called inequality constraints, to distinguish these from the linear constraints represented by the matrix A. Also, the requirement that variables are integer (e.g., $x_z$ integer) is called a restriction. The set of non-integer variables is denoted as $R=\{1, \ldots, n\}\backslash Z$. As is known, the symbol "\" represents set subtraction (e.g., such that R does not include the integers in Z). It is also assumed that that a feasible solution $x^0$ 103 is provided to this problem. In order to first solve (1.1), first a linear programming relaxation is solved, where the integrality restriction is removed. This problem (e.g., linear programming relaxation 150-1) is defined as:

minimize $c^T x$ subject to $Ax = b$ $x \geq 0$ (1.2)

The problem (1.2) is solved by an LP solver. A MILP solver (e.g., MILP solver 140) has an LP solver inside and the LP solver may be implemented by indicating the problem has no integer restrictions. Let $x^*$ be the optimal solution and $z^*_{LP}$ be the optimal objective value to (1.2). Let the integer variables that are positive in the solution to the linear programming relaxation 150-1, along with the integer variables that are positive in the feasible solution $x^0$ 103, define the set $P = \{j \in Z | x^*_j > 0\} \cup \{j \in Z | x_j^0 > 0\}$.

Given the set P, a restricted mixed integer problem (RMIP), also called a working MILP problem 150-2, is defined as follows:

minimize $c_R^T x_R + c_P^T x_P$ subject to $A_R x_R + A_P x_P = b$ $x_R, x_P \geq 0$ $x_R \in \Re^{|R|}$ $x_P \in \Re^{|P|}$ $x_P$ integer (1.3)

It is noted that $|R|$ is the number of elements in R, $|P|$ is the number of elements in P, and $\Re$ is the set of real numbers. Let $(\hat{x}^*_R, \hat{x}^*_P)$ denote the optimal solution and $z^*_{RMIP}$ denote the optimal objective value of (1.3).

2. Additional Detail

If $z^*_{RMIP} = z^*_{LP}$, then $(\hat{x}^*_R, \hat{x}^*_P)$, along with $x_j = 0$ for all $j \in Z \backslash P$, is the optimal solution to the original mixed integer program (1.1). Suppose that $z^*_{RMIP} > z^*_{LP}$. Let $l_P = \hat{x}^*_P$. Consider the following linear program (the special LP problem 150-3):

minimize $c_R^T x_R + c_P^T x_P$ subject to $A_R x_R + A_P x_P = b$ $x_R \geq 0$ $x_P \geq l_P$ $x_R \in \Re^{|R|}$ $x_P \in \Re^{|P|}$ (2.1)

and its associated dual:

maximize $b^T y + l_P^T z$ subject to $A_R^T y \leq c_R$ $A_P^T y + z = c_P$ $z \geq 0$ $z \in \Re^{|P|}$ $y \in \Re^m$ (2.2)

The y and z are known as dual prices. The program (2.1) is represented as the Min version 151 of FIG. 1, and the program (2.2) is represented as the Max version 153 of FIG. 1. For those not familiar with linear programming, the coefficients that bound the inequalities in the primal space (e.g., of (2.1)) are used to compute the objective in the dual space (e.g., of (2.2)). The coefficients used to compute the objective in the primal space bound the inequalities in the dual space. Both the primal and the dual problems make use of the same matrix. In the primal space, this matrix expresses, e.g., the consumption of physical quantities of inputs necessary to produce set quantities of outputs. In the dual space, the matrix expresses, e.g., creation of the economic values associated with the outputs from set input unit prices. When the primal problem (2.1) is solved to optimality, well-known linear programming theory demonstrates that the optimal objective function values of (2.1) and (2.2) are equal, and the optimality of the solution to (2.1) is demonstrated by presenting a solution to (2.2).

Let $\pi = y$ and $\sigma = z$ be the optimal solution to the dual linear program (2.2). By definition of the optimality conditions for linear programming, $c_R - \pi^T A_R \geq 0$ and $c_P - \pi^T A_P \geq 0$.

It can be shown that the vector $\pi$ satisfies $\pi^T b \leq z^*_{RMIP}$. By definition, $(\hat{x}^*_R, \hat{x}^*_P)$ is a feasible solution to (2.1), and $z^*_{RMIP} = c_R^T \hat{x}^*_R + c_P^T \hat{x}^*_P$. From duality theory, one has that $b^T \pi + l_P^T \sigma \leq c_R^T \hat{x}^*_R + c_P^T \hat{x}^*_P$, which implies that $b^T \pi + l_P^T \sigma \leq z^*_{RMIP}$. Since $l_P \geq 0$ and $\sigma \geq 0$, it then follows that $\pi^T b \leq z^*_{RMIP}$.

3. Exemplary Price-and-Branch Algorithms

Figure 2A:
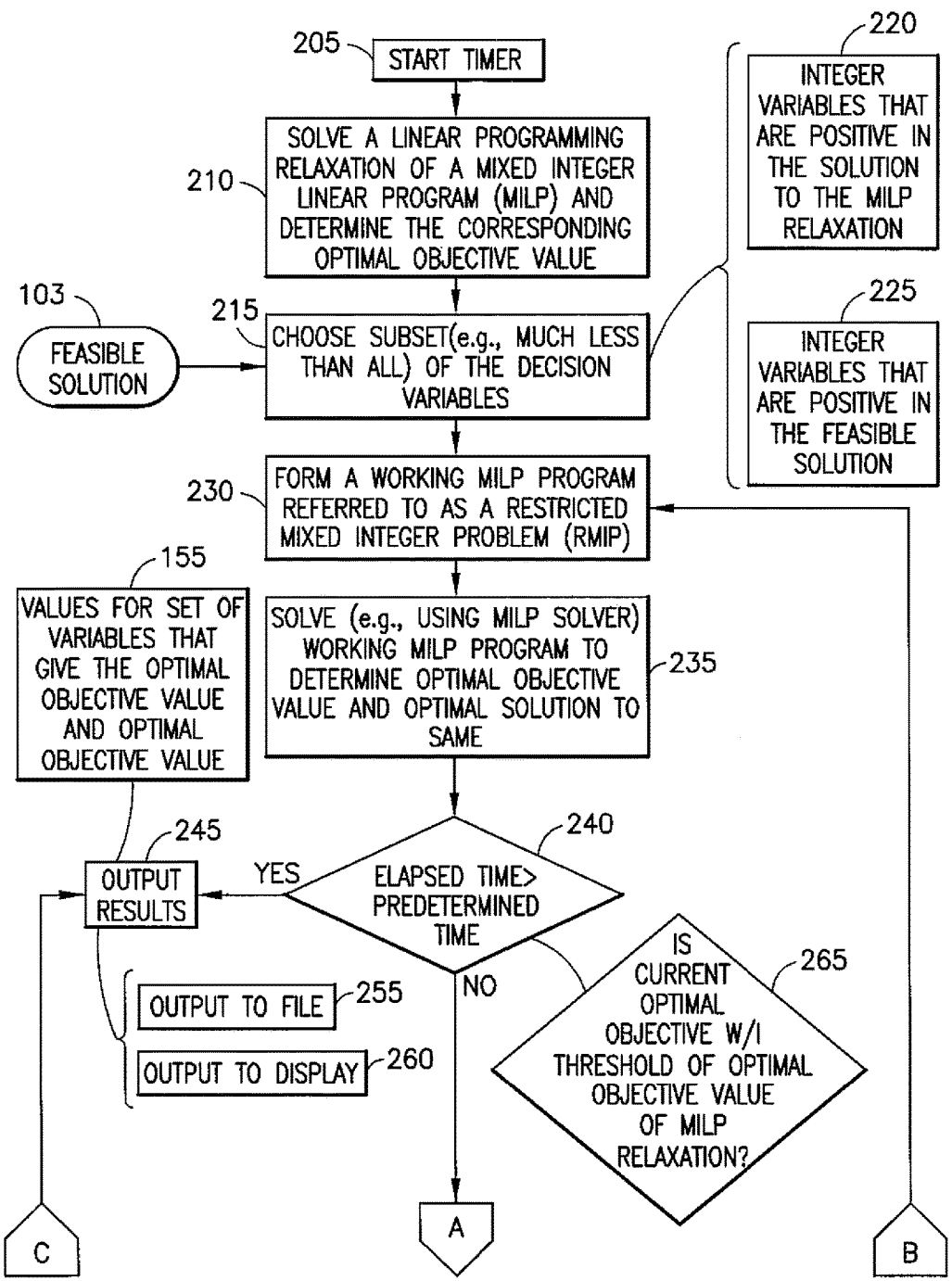

This suggests the following algorithm for solving the mixed integer program (1.1), with the assumption that a feasible solution $x^0$ is given. These exemplary algorithms are presented by reference to FIG. 2, which includes FIGS. 2A and 2B. FIG. 2 is a logic flow diagram for performing a price-and-branch algorithm for mixed integer linear programming, and illustrates the operation of an exemplary method, a result of execution of computer program instructions embodied on a computer readable memory, and/or functions performed by logic implemented in hardware, in accordance with an exemplary embodiment. It is assumed that the computing system 100 performs the operations in FIG. 2, e.g., under control of the price and branch tool 165. In block 205, a timer, to be used later, is started in an exemplary embodiment.

1. Solve the linear programming relaxation (1.2) of the MILP and determine $z^*_{LP}$ and $x^*$. This occurs in block 210.

2. In block 215, a subset (e.g., much less than all) of the decision variables 152 are chosen. That is, let $P = \{j \in Z | x^*_j > 0\} \cup \{j \in Z | x_j^0 > 0\}$, where $\{j \in Z | x^*_j > 0\}$ selects (block 220) indices corresponding to integer variables that are positive in the solution to the MILP relaxation and $\{j \in Z | x_j^0 > 0\}$ selects (block 225) indices corresponding to integer variables that are positive in the feasible solution $x^0$ 103. Thus, the set P contains indices into the vector x. It may also be possible to examine the values of $c_j-\pi^T A_j$ and select values that have a value equal to zero or for which the values are "small" (i.e., within some criterion), or for which the smallest values represent a small percentage (e.g., one percent) of the total number of variables n.

3. Let Q=Z\P. Form and solve the restricted mixed integer program (1.3) and determine the optimal value $z^*_{RMIP}$ and the optimal solution $(\hat{x}^*_R, \hat{x}^*_P)$. This occurs in block 230, where a working MILP problem 150-2, referred to as a restricted mixed integer problem (RMIP), is formed using the subset of variables. Additionally, in block 235, the working MILP problem 150-2 is solved (e.g., using MILP solver 140) to determine an optimal objective value and optimal solution to the working MILP program.

4. If $z^*_{RMIP}=z^*_{LP}$, terminate, as the solution $x_R=\hat{x}^*_R, x_P=\hat{x}^*_P$, and $x_Q=0$ is optimal for (1.1). In an exemplary embodiment, the algorithm ends in response to an elapsed time (e.g., as indicated by the timer previously started) being greater than a predetermined time (block 240=Yes). Assuming for now that the elapsed time is not greater than the predetermined time (block 240=No), the flow proceeds to block 270.

5. In block 270, the computing system 100 uses the solution to the working MILP problem 150-2 to form a special LP problem 150-3 (e.g., the Min version 151 in the dual MILP problem 150-3, where the Min version 151 is shown above as (2.1)) to determine the price of each constraint relative to the working MILP problem 150-2. That is, use the solution to (1.3) to define (2.1), and solve this linear problem 150-3 (block 275). Note that this also solves the dual problem, Max version 153 (see also (2.2) above), of the special LP problem 150-3. Further note that (2.1) lacks a restriction that $x_P$ integer and also requires $x_P \geq l_P$, where $l_P=\hat{x}^*_P$ and $\hat{x}^*_P$ is a portion of the optimal solution to (1.3). Let $\pi$ be the dual solution corresponding to the matrix A in the Max version 153 of the dual MILP problem 150-3.

6. In block 280, the computing system 100 evaluates variables not in working MILP problem 150-2 to determine if the variables can contribute to an improved solution. That is, let $T=\{j \in Z | c_j-\pi^T A_j < 0\}$. The set T also contains indices into the vector x (such that the indices in the set T correspond to those values from the set Z that satisfy $c_j-\pi^T A_j<0$). If T is empty (that is, there are no variables found that can contribute to an improved solution, block 285=No), then the solution $x_R=\hat{x}^*_R, x_P=\hat{x}^*_P$, and $x_Q 0$ is suitable for (1.1). Flow proceeds to block 245. Otherwise, there are additional variables that can contribute to an improved solution (block 285=Yes), so let P=P∪T (e.g., add variables from block 280 to the working MILP program in block 290) and return to Step 3 (e.g., block 230 in FIG. 2).

Typically, flow would proceed through blocks 240, 270, 275, 280, 285, 290, 230 and 235 multiple times before the flow ends when results 155 are output in block 245.

Although elapsed time is used above as one metric, and a typical one, that may be used to determine when to stop the flow in FIG. 2, block 265 shows another possibility. In block 265, the computing system 100 determines whether a current optimal objective value is within a threshold of an optimal objective value of the LP relaxation 150-1. This difference (between the current optimal objective value and the optimal objective value of the LP relaxation 150-1) is used to determine how close a current solution is to an optimal solution.

In block 245, the results 155 are output, which may be to a file (block 255) or to a display (block 260). The results 155 are shown in FIG. 2 as being values for a set of variables that give the optimal objective value and also the optimal objective value for the ending working MILP problem 150-2.

As opposed to branch-and-price strategies, the above algorithms leverage the full power of modern mixed integer programming solvers, such as IBM's (International Business Machine's) ILOG CPLEX, which is a high-performance mathematical programming solver for linear programming, mixed integer programming, and quadratic programming. Each time the restricted mixed integer program (1.3) is solved, techniques such as presolve, heuristics, cuts, and dynamic search are used by the solver. In addition, the solution to this restricted mixed integer programming problem provides a feasible starting solution for the next solve to the restricted mixed integer program with additional variables, and the solver can leverage that solution when solving the new version of the restricted mixed integer program.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium does not include propagating signals and may be, for example, but is not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable storage medium does not include a propagating wave.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:

forming, by a computing system, a working mixed integer linear program from a given mixed integer linear program for job allocation to allocate people to jobs at least by choosing a subset of variables from the given mixed integer linear program, wherein only person/job combinations that are deemed most valuable are chosen for the subset, wherein the working mixed integer linear program includes the chosen subset of variables but no other variables from the given mixed integer linear program;

solving, by the computing system, the working mixed integer linear program to determine a solution;

forming, by the computing system using the solution, a special linear program;

solving, by the computing system, the special linear program to determine a price of each constraint relative to the solution;

evaluating, by the computing system and using the prices, variables that are not in the working mixed integer linear program to determine any variables that can contribute to an improved solution;

adding, by the computing system, the variables evaluated as contributing to an improved solution to the working mixed integer linear program; and solving, by the computing system, the working mixed integer linear program with the added variables.

2. The method of claim 1, wherein:

forming the special linear program further comprises forming a primal version of the special linear program;

solving the special linear program further comprises solving the primal version of the special linear program to determine information for a dual version of the special linear program, wherein solving the primal version also solves the dual version and the dual version determines the price of each constraint relative to the solution.

3. The method of claim 2, wherein the primal version of the special linear program lacks a restriction that a set of variables are integers but has an inequality constraint that the set of variables in the special linear program are greater than or equal to an optimal solution for a set of integer variables in the working mixed integer linear program.

4. The method of claim 3, wherein:

the primal version of the special linear program is as follows:

minimize $c_R^T x_R + c_P^T x_P$ subject to $A_R x_R + A_P x_P = b$ $x_R \geq 0$ $x_P \geq l_P$ $x_R \in \mathfrak{R}^{|R|}$ $x_P \in \mathfrak{R}^{|P|}$, wherein R indicates the indices of variables that are not restricted to be integer, P indicates the indices of variables that are restricted to be integers, c are coefficients, x are variables, A is a matrix with m constraints and n variables, b is the right-hand-side, $l_P$ is set to $\hat{x}^*_P$, which is an optimal solution for the working mixed integer linear program, and T indicates transpose; and wherein the working mixed integer linear program has a restriction that $x_P$ integer but the special linear program does not have this restriction.

5. The method of claim 4, wherein:

the dual version of the special linear program is as follows:

maximize $b^T y + l_P^T z$ subject to $A_R^T y \leq c_R$ $A_P^T y + z = c_P$ $z \geq 0$ $z \in \Re^{|P|}$ $y \in \Re^m$, wherein y and z are variables.

6. The method of claim 5, wherein:

$\pi = y$ represents an optimal solution to a dual solution of the special linear program;

evaluating variables that are not in the working mixed integer linear program to determine any variables that can contribute to an improved solution further comprises setting $T = \{j \in Z | c_j - \pi^T A_j < 0\}$, wherein a set $Z \subseteq \{1, \ldots, n\}$ represents variables required to be integer, and wherein $c_j - \pi^T A_j < 0$ determines variables that can contribute to an improved solution; and adding the variables that can contribute to an improved solution to the working mixed integer linear program further comprises adding the set T to a set of variables for the working mixed integer linear program.

7. The method of claim 5, wherein forming the working mixed integer linear program further comprises:

$\pi = y$ represents an optimal solution to a dual solution of the special linear program;

evaluating variables that are not in the working mixed integer linear program to determine any variables that can contribute to an improved solution further comprises examining values of $c_j - \pi^T A_j$ for a set $T = \{j \in Z | c_j - \pi^T A_j\}$, wherein a set $Z \subseteq \{1, \ldots, n\}$ represents variables required to be integer, and one of selecting values of $c_j - \pi^T A_j$ that have a value equal to zero or selecting values of $c_j - \pi^T A_j$ for which the values are within some criterion or selecting values of $c_j - \pi^T A_j$ for which smallest values represent a predetermined percentage of a total number of variables n; and adding the variables that can contribute to an improved solution to the working mixed integer linear program further comprises adding the selected variables to a set of variables for the working mixed integer linear program.

8. The method of claim 1, further comprising performing the evaluating variables that are not in the working mixed integer linear program, adding the variables evaluated as contributing to an improved solution to the working mixed integer linear program, and solving the working mixed integer linear program with the added variables until a criterion is met.

9. The method of claim 8, wherein the criterion is whether a current time is greater than an elapsed time.

10. The method of claim 8, wherein the criterion is a difference between a current optimal objective value and an objective value of the linear programming relaxation of the mixed integer linear program is less than a predetermined difference.

11. An apparatus, comprising:

one or more memories comprising computer-readable code;

one or more processors, wherein the one or more processors are configured, in response to execution of the computer-readable code, to cause the apparatus to perform the following:

forming, by a computing system, a working mixed integer linear program from a given mixed integer linear program for job allocation to allocate people to jobs at least by choosing a subset of variables from the given mixed integer linear program, wherein only person/job combinations that are deemed most valuable are chosen for the subset, wherein the working mixed integer linear program includes the chosen subset of variables but no other variables from the given mixed integer linear program;

solving the working mixed integer linear program to determine a solution;

forming, using the solution, a special linear program;

solving the special linear program to determine a price of each constraint relative to the solution;

evaluating, using the prices, variables that are not in the working mixed integer linear program to determine any variables that can contribute to an improved solution;

adding the variables evaluated as contributing to an improved solution to the working mixed integer linear program; and solving the working mixed integer linear program with the added variables.

12. The apparatus of claim 11, wherein:

forming the special linear program further comprises forming a primal version of the special linear program;

solving the special linear program further comprises solving the primal version of the special linear program to determine information for a dual version of the special linear program, wherein solving the primal version also solves the dual version and the dual version determines the price of each constraint relative to the solution.

13. The apparatus of claim 12, wherein the primal version of the special linear program lacks a restriction that a set of variables are integers but has an inequality constraint that the set of variables in the special linear program are greater than or equal to an optimal solution for a set of integer variables in the working mixed integer linear program.

14. The apparatus of claim 13, wherein:

the primal version of the special linear program is as follows:

minimize $c_R^T x_R + c_P^T x_P$ subject to $A_R x_R + A_P x_P = b$ $x_R \geq 0$ $x_P \geq l_P$ $x_R \in \Re^{|R|}$ $x_P \in \Re^{|P|}$, wherein R indicates the indices of variables that are not restricted to be integer, P indicates the indices of variables that are restricted to be integers, c are coefficients, x are variables, A is a matrix with m constraints and n variables, b is the right-hand-side, $l_P$ is set to $\hat{x}^*_P$, which is an optimal solution for the working mixed integer linear program, and T indicates transpose; and wherein the working mixed integer linear program has a restriction that $x_P$ integer but the special linear program does not have this restriction.

15. The apparatus of claim 14, wherein:

the dual version of the special linear program is as follows:

maximize $b^T y + l_P^T z$ subject to $A_R^T y \leq c_R$ $A_P^T y + z = c_P$ $z \geq 0$ $z \in \mathfrak{R}^{|P|}$ $y \in \mathfrak{R}^m$, wherein y and z are variables.

16. The apparatus of claim 15, wherein:

$\pi = y$ represents an optimal solution to a dual solution of the special linear program;

evaluating variables that are not in the working mixed integer linear program to determine any variables that can contribute to an improved solution further comprises setting $T = \{j \in Z | c_j - \pi^T A_j < 0\}$, wherein a set $Z \subseteq \{1, \ldots, n\}$ represents variables required to be integer, and wherein $c_j - \pi^T A_j < 0$ determines variables that can contribute to an improved solution; and adding the variables that can contribute to an improved solution to the working mixed integer linear program further comprises adding the set T to a set of variables for the working mixed integer linear program.

17. The apparatus of claim 15, wherein forming the working mixed integer linear program further comprises:

$\pi = y$ represents an optimal solution to a dual solution of the special linear program;

evaluating variables that are not in the working mixed integer linear program to determine any variables that can contribute to an improved solution further comprises examining values of $c_j - \pi^T A_j$ for a set $T = \{j \in Z | c_j - \pi^T A_j\}$, wherein a set $Z \subseteq \{1, \ldots, n\}$ represents variables required to be integer, and one of selecting values of $c_j - \pi^T A_j$ that have a value equal to zero or selecting values of $c_j - \pi^T A_j$ for which the values are within some criterion or selecting values of $c_j - \pi^T A_j$ for which smallest values represent a predetermined percentage of a total number of variables n; and adding the variables that can contribute to an improved solution to the working mixed integer linear program further comprises adding the selected variables to a set of variables for the working mixed integer linear program.

18. The apparatus of claim 11, wherein the one or more processors are further configured, in response to execution of the computer-readable code, to cause the apparatus to perform the following: performing the evaluating variables that are not in the working mixed integer linear program, adding the variables evaluated as contributing to an improved solution to the working mixed integer linear program, and solving the working mixed integer linear program with the added variables until a criterion is met.

19. A computer program product comprising a computer readable storage medium having program code embodied therewith, the program code executable by a computing system to cause the computing system to perform:

forming, by a computing system, a working mixed integer linear program from a given mixed integer linear program for job allocation to allocate people to jobs at least by choosing a subset of variables from the given mixed integer linear program, wherein only person/job combinations that are deemed most valuable are chosen for the subset, wherein the working mixed integer linear program includes the chosen subset of variables but no other variables from the given mixed integer linear program;

solving the working mixed integer linear program to determine a solution;

forming, using the solution, a special linear program;

solving the special linear program to determine a price of each constraint relative to the solution;

evaluating, using the prices, variables that are not in the working mixed integer linear program to determine any variables that can contribute to an improved solution;

adding the variables evaluated as contributing to an improved solution to the working mixed integer linear program; and solving the working mixed integer linear program with the added variables.

20. The computer program product of claim 19, wherein:

forming the special linear program further comprises forming a primal version of the special linear program;

solving the special linear program further comprises solving the primal version of the special linear program to determine information for a dual version of the special linear program, wherein solving the primal version also solves the dual version and the dual version determines the price of each constraint relative to the solution.

* * * * *